US011928664B2

(12) United States Patent
Bajaj et al.

(10) Patent No.: US 11,928,664 B2
(45) Date of Patent: Mar. 12, 2024

(54) SYSTEMS AND METHODS FOR PROCESSING CARDLESS TRANSACTIONS

(71) Applicant: Fidelity National E-Banking Services, Inc., Jacksonville, FL (US)

(72) Inventors: Hitesh Bajaj, Duluth, GA (US); Douglas G. Brown, Grafton, WI (US); Robert Woodbury, Flemington, NJ (US); Neil Marcous, Bay Head, NJ (US); Peter Gordon, Sharon, MA (US); Renee Goodheart, Midland Park, NJ (US); Mark Elliott, Summit, NJ (US)

(73) Assignee: Fidelity Information Services, LLC, Jacksonville, FL (US)

( * ) Notice: Subject to any disclaimer, the term of this patent is extended or adjusted under 35 U.S.C. 154(b) by 0 days.

(21) Appl. No.: 16/874,450

(22) Filed: May 14, 2020

(65) Prior Publication Data
US 2020/0273016 A1    Aug. 27, 2020

Related U.S. Application Data

(63) Continuation of application No. 14/154,111, filed on Jan. 13, 2014, now abandoned.

(51) Int. Cl.
*G06Q 20/32*    (2012.01)
*G06Q 20/02*    (2012.01)
(Continued)

(52) U.S. Cl.
CPC ........... *G06Q 20/325* (2013.01); *G06Q 20/02* (2013.01); *G06Q 20/1085* (2013.01); *G06Q 20/385* (2013.01); *G07F 19/20* (2013.01)

(58) Field of Classification Search
CPC .. G06Q 20/325; G06Q 20/02; G06Q 20/1085; G06Q 20/32; G06Q 20/385;
(Continued)

(56) References Cited

U.S. PATENT DOCUMENTS 6,454,647 B1    9/2002  Woodbury
7,349,871 B2 *  3/2008  Labrou ................... G06Q 20/02
                                                    705/26.35
(Continued)

FOREIGN PATENT DOCUMENTS

CN          101583968 A  * 11/2009  ......... G06Q 20/3572

*Primary Examiner* — Kenneth Bartley
(74) *Attorney, Agent, or Firm* — Finnegan, Henderson, Farabow, Garrett & Dunner, LLP

(57) ABSTRACT

Systems and methods are provided for processing cardless financial transactions at transaction devices such as Automated Teller Machines. An example method comprises receiving a transaction request including at least one transaction parameter and receiving a substitute value representing an account for processing the transaction request. The substitute value is distinct from an account number associated with the account. The method further comprises sending the at least one transaction parameter and the substitute value to a payment network associated with the substitute value and completing the transaction request. A second method comprises receiving a transaction request with at least one transaction parameter and a substitute value. The second method further comprises determining account credentials associated with the substitute value using the account credentials.

20 Claims, 10 Drawing Sheets

(51) Int. Cl.
*G06Q 20/10* (2012.01)
*G06Q 20/38* (2012.01)
*G07F 19/00* (2006.01)

(58) Field of Classification Search
CPC ........ G06Q 20/10; G06Q 20/38; G07F 19/20; G07F 19/00
See application file for complete search history.

(56) References Cited

U.S. PATENT DOCUMENTS

| | | | |
|---|---|---|---|
| 7,506,804 | B2 | 3/2009 | Zajkowski et al. |
| 8,229,852 | B2 * | 7/2012 | Carlson ................ G06Q 20/382 |
| | | | 705/44 |
| 2012/0160912 | A1 | 6/2012 | Laracey |
| 2012/0271761 | A1 | 10/2012 | Kight et al. |
| 2013/0246274 | A1 | 9/2013 | Marcous et al. |
| 2013/0290119 | A1 * | 10/2013 | Howe .................. G06Q 20/401 |
| | | | 705/16 |
| 2013/0297504 | A1 | 11/2013 | Nwokolo et al. |
| 2013/0325695 | A1 | 12/2013 | Imrey et al. |
| 2013/0346222 | A1 | 12/2013 | Ran |
| 2014/0074724 | A1 | 3/2014 | Gordon et al. |
| 2014/0344153 | A1 * | 11/2014 | Raj .................... G06Q 20/3821 |
| | | | 705/44 |
| 2015/0066745 | A1 * | 3/2015 | Lee ........................ H04L 63/08 |
| | | | 705/39 |

* cited by examiner

200C

103

Please enter your login details

| Username | username18569073 |
| Password | ************ |

Login  Cancel

SYSTEMS AND METHODS FOR PROCESSING CARDLESS TRANSACTIONS

This application is a continuation of U.S. patent application Ser. No. 14/154,111, filed Jan. 13, 2014, the content of which is incorporated herein by reference in its entirety.

FIELD

Embodiments of this disclosure relate to processing cardless transactions utilizing transaction devices such as Automated Teller Machines.

BACKGROUND

Automated Teller Machines (ATMs) have been used for decades to enable round-the-clock access to financial institution accounts such as deposit accounts at banks. Using ATMs, account holders can withdraw funds, deposit funds, and access account information. Some ATMs also enable other transactions, such as bill pay, ticket purchases, and stamp purchases.

Many ATMs are associated with a particular financial institution. This limits ATMs from performing certain transactions. For example, if an account holder has an account with Bank A, he may be unable to use an ATM operated by or on behalf of Bank B to withdraw money from his Bank A account. And even if that account holder can withdraw money from the Bank B ATM, he may be charged a high fee (by Bank B or Bank A), unable to deposit funds into his account at Bank A, or unable to access other account functions such as requesting a balance inquiry. This problem is compounded when the account holder attempts to use an ATM in a foreign country. He may be unable to access his account because of a relationship between his bank and the foreign bank owning the ATM, or may be charged extra international fees.

Furthermore, ATMs generally require that an account holder present a card with a magnetic stripe to withdraw funds from an ATM. Thieves know this, and have created devices to steal the data stored on that magnetic stripe. Thus, new systems have been developed that enable account holders to utilize smartphones to access their accounts. However, the solutions that exist for enabling smartphone access to accounts do not allow account holders to access accounts using smartphones at an ATM other than one owned by the bank holding the account, even if the bank owning the ATM has a relationship with the bank holding the account.

Another drawback of existing solutions is their reliance on card credentials issued by a credit or debit card network. Thus even where these solutions offer the convenience of not requiring a physical card to be presented at the ATM, their use of the credentials associated with the physical card nevertheless subject the transaction to extraneous fees and routing requirements. Yet another disadvantage of existing solutions is that, in many systems, the ATM receives an account number associated with the account holder's account. If a thief is able to spoof the ATM's identity, he may be able to intercept the account number and use it to withdraw money without the account holder's permission.

It is accordingly a primary object of the disclosed embodiments to solve these problems as well as many others (e.g., similar problems associated with point-of-sale transactions).

SUMMARY

Embodiments of the present disclosure are directed to methods, systems, and computer-readable media for enabling financial transactions at transaction devices such as ATMs. An example method comprises receiving a transaction request including at least one transaction parameter and receiving a substitute value being associated with an account for processing the transaction request. The substitute value is distinct from an account number associated with the account. The method further comprises sending the at least one transaction parameter and the substitute value to a payment network associated with the substitute value and completing the transaction request by, for example, outputting funds, receiving funds, or displaying a balance.

Systems and computer-readable media (such as non-transitory computer-readable media) that implement the above method are also provided.

A second method comprises receiving a transaction request with at least one transaction parameter and a substitute value. The second method further comprises determining if the substitute value is associated with a payment network, and determining account credentials associated with the substitute value.

Systems and computer-readable media (such as non-transitory computer-readable media) that implement the above method are also provided.

Additional objects and advantages of the embodiments will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and together with the description, serve to explain some principles.

FIG. 2C shows illustrations of a user interface for processing a transaction using a transaction device, consistent with disclosed embodiments.

BRIEF OVERVIEW

Example embodiments of this disclosure are related to enabling account holders to effect cardless financial transactions at transaction devices such as ATMs. The ATMs can receive transaction requests which include transaction parameters. The transaction parameters can indicate a desire by an account holder to perform particular transactions, including withdrawals, deposits, balance inquires, ticket purchases, stamp purchases, balance transfers, or other transactions.

More specifically, some embodiments enable account holders to perform these types of transactions without having to utilize an ATM owned or operated by the same bank that holds their account, without having to use a debit or bank card with a magnetic strip, and without the ATMs receiving an actual card number or account number. Some embodiments also include ATMs receiving substitute values that refer to accounts (but do not include account numbers), constructed values (that resemble payment card numbers), or dynamic tokens (which correspond to substitute values or other credentials in a database).

DETAILED DESCRIPTION

Reference will now be made in detail to various embodiments, examples of which are illustrated in the accompanying drawings. Wherever possible, the same reference numbers will be used throughout the drawings to refer to the same or like parts.

Figure 1:
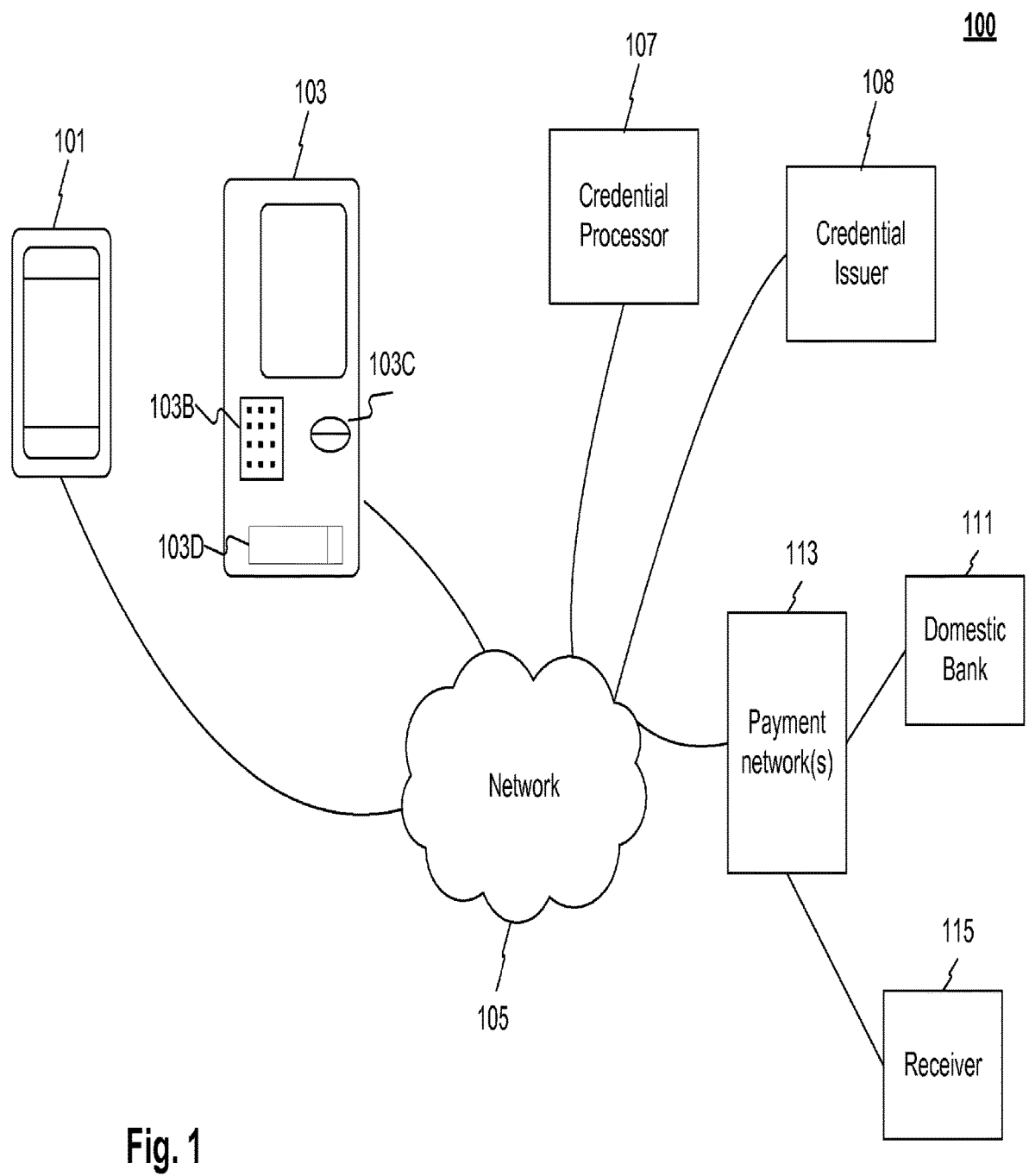
FIG. 1 is a system for use in implementing the disclosed embodiments.

FIG. 1 is a system 100 for use in implementing the disclosed embodiments. System 100 comprises mobile device 101, transaction device 103, network 105, credential processor 107, credential issuer 108, domestic bank 111, payment network 113, receiver 115, and international institution 117. One of ordinary skill will understand that particular devices in system 100 can be duplicated, omitted, or modified, as appropriate.

In some embodiments, each device illustrated in FIG. 1 may be operated by separate parties. However, in other embodiments, one party may operate or administer more than one of the devices illustrated in FIG. 1. For example, a single entity may operate any or all of credential processor 107, credential issuer 108, and payment network 113. Additionally, in some embodiments, one of the illustrated devices in FIG. 1 may be combined with another illustrated device. For example, credential processor 107, credential issuer 108, and payment network 113 may be combined into a single system.

Mobile device 101 represents a portable device usable by a user for communication purposes. Mobile device 101 may be implemented as a cellular phone, smartphone, wearable computer, personal digital assistant (PDA), personal media player (PMP), or the like. Mobile device 101 may comprise, for example, a touchscreen display, a non-touchscreen display, a keyboard, a pointing device, or other input device. Mobile device 101 may communicate with network 105 using a wireless network, a mobile network, a satellite network, or the like. Mobile device 101 can communicate with other devices, such as credential processor 107, credential issue 108, or transaction device 103, over network 105.

Mobile device 101 may comprise storage for software that, when executed, causes mobile device 101 to send and/or receive information from devices such as transaction device 103. The software may be implemented in a variety of ways. In one example embodiment, the software may be operable to send and/or receive information from other devices using wireless protocols. For example, the software can be configured to enable mobile device 101 to send and/or receive information over a Bluetooth connection, over a wireless network connection (e.g., 802.11a/b/g/n), using Near-Field Communication (NFC), or other standard or proprietary communication protocol. The software may also be configured to enable the receipt of information visually. For example, mobile device 101 may have camera connected to it or scanner functionality, and may capture information encoded in an image or a visual symbol displayed on transaction device 103 (such as a barcode).

Mobile device 101 also enables a user to select an account from a list of accounts (e.g., accounts owned by the user) by presenting a list of available accounts. Mobile device 101 may receive a list of such accounts from another system, such as credential processor 107. After the selection of an account, mobile device 101 transmits the transaction data and an indication of the selected account to another device. The indication of the selected account may comprise, for example, an identifier for the account or an index value related to the account (e.g., the first presented account having an index value of "1" and the second presented account having an index value of "2").

Transaction device 103 represents a device configured to perform one or more financial transactions. Transaction device 103 may be implemented as, for example, an Automated Teller Machine (ATM). Transaction device 103 may comprise a keypad 103B (also known as a "10-key"). Keypad 103B may comprise 10 or more keys enabling input of letters, numbers, symbols, or other characters. Keypad 103B may be implemented as a physical keypad or as a virtual keypad (e.g., presented on a touchscreen of transaction device 103).

Transaction device 103 may also comprise a touchscreen display or a non-touchscreen display. Transaction device 103 may also comprise a card slot 103C enabling, for example, insertion of magnetic-stripe cards. Transaction device 103 may be connected to network 105 via a wireless network, a wired network, a cellular network, a satellite network, or the like, and may communicate with other devices, such as mobile device 101, credential processor 107, or credential issuer 108, over network 105. Transaction device 103 may also comprise a cash drawer 103D. Cash drawer 103D is configured to permit users can retrieve funds withdrawn from a user account.

In some embodiments, transaction device 103 may perform operations for initiating transactions. For example, transaction device 103 may communicate directly with one or more of network 105, credential processor 107, or payment network 113. However, in other embodiments, transaction device 103 may communicate directly with drivers or switches (not pictured) which perform communications on behalf of transaction device 103. Such drivers and/or switches receive communication from one or more transaction devices 103, reformat the communication into instructions that comply with a protocol associated with payment network 113, and forward the reformatted communication to payment network 113, as appropriate. Drivers may also provide instructions to transaction device 103, provide images or other information for display, provide communications received from other systems (such as payment network 113) to transaction device 103, or the like.

Transaction device 103 comprises storage for software that, when executed, causes transaction device 103 to send and/or receive information from devices such as mobile device 101. In one example embodiment, the software may be operable to send and/or receive information from other devices using wireless protocols. For example, the software can be configured to enable transaction device 103 to send and/or receive information over a Bluetooth connection, over a wireless network connection (e.g., 802.11a/b/g/n), using Near-Field Communication (NFC), or other standard or proprietary communication protocol. The software may also be configured to enable sending information to mobile device 101 in a visual manner. For example, transaction device 103 may have functionality for displaying information encoded using a visual symbol displayed on transaction device 103 (such as a barcode), enabling mobile device 101 to capture an image and receive the encoded information.

Transaction device 103, in some embodiments, communicates with mobile device 101 using Near Field Communication (NFC) technology. NFC technology enables one- or two-way wireless communication between devices separated by a short distance. In some embodiments, NFC technology enables two devices to send data directly to each other. In other embodiments, NFC technology provides the devices the ability to set up, or "bootstrap," a wireless connection between the devices. The connection can be, for example, a Bluetooth connection, a Wi-Fi Direct connection, a Wi-Fi connection, or the like. After the connection between the devices is set up, the devices can send data to each other over that connection.

Mobile device 101 and transaction device 103 are not limited to using NFC or other local wireless connections to communicate directly with one another. For example, transaction device 103 and mobile device 101 may be configured to exchange data by communicating with a separate device connected to network 105.

In some embodiments, a user may utilize keypad 1038 to input data into transaction device 103, including user credentials associated with one or more accounts owned by the user. One of ordinary skill will appreciate that other input devices, such as biometric devices, also may be used to communicate data from the user to the transaction device.

Network 105 represents an electronic network for transmitting data between electronic devices. Network 105 may be implemented as one or more of the Internet, an intranet, a private link (such as a fiber optic network connecting remote sites), or the like.

Credential processor 107 represents one or more electronic devices that store data for processing transactions. For example, credential processor 107 stores user credentials associated with one or more accounts associated with the user, in a database associated with credential processor 107. The user credentials comprise, for example, username and password combinations associated with a user, email addresses associated with a user, phone numbers, tokens or identifiers associated with mobile device 101, a user, or a user account, biometric data associated with a user, or the like.

A database connected to credential processor 107 stores a substitute value associated with the user credentials. The substitute value may take any form, for example, alphanumeric, alphabetic, numeric, text, hash-based, or binary. In some embodiments, the substitute value may be formed such that transaction device 103 recognizes it as associated with a particular network (such as payment network 113). A substitute value corresponding to a user's account is distinct from the actual account credentials of the account.

For example, the substitute value may be in the form of a constructed value. A constructed value, in some embodiments, comprises a string of numbers formatted to resemble a payment card number (also known as a bank card number, PAN or a Primary Account Number). Some portion of the digits of the constructed value may serve as an indicator value that enables systems that are involved in financial transaction processing to determine a network, such as a payment network, for processing a financial transaction with that card number. For example, in some cases an indicator value may be the first few digits of such numbers contain a Bank Identification Number (BIN), also known as an Issuer Identification Number or IIN. For example, VISA cards typically have a "4" as the first digit.

For example, such a constructed value may contain a particular value as part of the indicator value, such as '59,' which indicates that the constructed value is associated with a particular network (such as payment network 113). Although the constructed value does not represent a particular account, the constructed value's attribute of resembling a payment card enables payment network 113 to route a transaction that includes the constructed value as though it were a transaction that included an actual PAN.

Credential processor 107, in some embodiments, receives a request to generate credentials from a user (e.g., from mobile device 101, transaction device 103, or a personal computer). Credential processor 107 may forward the request to credential issuer, receive credentials in response, and forward them to credential issuer 108. In other embodiments, however, a user can request the generation of credentials directly from credential issuer 108.

Credential processor 107, in some embodiments, can receive a request for a substitute value corresponding to a particular account selected by a user (e.g., from mobile device 101 or transaction device 103). In some embodiments, credential processor 107 can determine the substitute value associated with a particular account and send the substitute value back to transaction device 103 for processing. In other embodiments, credential processor 107 may be configured to send a dynamic token in lieu of or in addition to the substitute value to transaction device 103, and may instead request a dynamic token associated with the substitute value by sending a request to credential issuer 108.

Credential issuer 108 represents one or more electronic devices that generate data for processing transactions. In some embodiments, credential issuer 108 generates one or more substitute values in response to a registration process conducted by the user using, e.g., mobile device 101, transaction device 103, credential processor 107, or payment network 113 (such as described more fully below with respect to FIG. 3A). In some embodiments, the generated substitute value is distinct from the actual account credentials of a user's account(s).

Credential issuer 108, in some embodiments, generates substitute values upon receiving a request from, for example, credential processor 107. The substitute values may be generated to resemble PANs.

Credential issuer 108 may perform a look-up or cross-reference to a database (or other data store) for the received substitute value. After receiving the substitute value, credential issuer 108 may return a dynamic token associated with the substitute value. The dynamic token, in some embodiments, may be an identifier or other piece of data that is usable for only a single transaction and represents a substitute value and/or account credentials stored at credential issuer 108. In this manner, the actual account credentials need not be communicated to mobile device 101 or transaction device 103 (or its associated switch/driver), and thus security is enhanced. This token is returned to credential processor 107.

One of ordinary skill will understand that the functionality of credential processor 107 and credential issuer 108 may be combined into a single device or set of electronic devices.

Payment network 113 represents one or more electronic devices that provide functionality for a variety of financial transactions, such as the electronic exchange of funds. Payment network 113 may interconnect financial institutions, such as banks, to one another. Payment network 113 may also comprise other interconnections, such as to merchants, terminal providers, other payment networks, or the like. In some embodiments, payment network 113 may comprise more than one payment network. In some embodiments, payment network 113 may connect one or more financial institutions (such as domestic bank 111) or receivers (such as receiver 115) to one another for financial purposes. These receivers can be, for example, financial institutions, merchants, other payment networks, other fund transfer networks, or the like.

In some embodiments, payment network 113 may comprise one or more interbank networks, sometimes called ATM networks, which may enable multiple banks to access information and funds of accounts held by one another. Examples of payment networks include, e.g., NYCE Payments Networks, LLC's NYCE®, PayNet Payment Networks, LLC's PayNet™, and Interac Association's Interac®. In some embodiments, payment network 113 may be implemented as described in U.S. Patent Application Publication No. 2013/0246274, filed Mar. 15, 2013, and entitled "Systems and Methods for Real-time Account Access." Payment network 113 may also be implemented as a payment network as described in (not yet published) U.S. patent application Ser. No. 14/081,590, filed Nov. 15, 2013, and entitled "Systems and Methods for Real-time Account Access." The contents of these applications are hereby incorporated by reference in their entirety.

Two entities that have relationships with payment network 113 are said to be "connected to" one another over payment network 113. As an example, if a user having an account with a bank connected to payment network 113 attempts to access an account at an ATM owned by another bank also connected to payment network 113, each bank may communicate with the other using payment network 113 to complete the transaction. Payment network 113 may operate domestically or internationally, across one or more countries, to allow communications between entities, such as banks, that are not located in the same country. This may be accomplished, for example, via connections through a gateway, other networks, or other payment networks.

Domestic bank 111 represents a bank or other deposit institution that may be located in the same country as payment network 113. Domestic bank 111 may have one or more accounts, such as deposit accounts, checking accounts, savings accounts, credit accounts, mortgages, Certificates of Deposit (CDs), or the like. These accounts may be located at domestic bank 111 who may hold them on behalf of one or more users. In some embodiments, users may utilize the disclosed systems and methods to effect deposit transactions. In these embodiments, receiver 115 can be configured to receive funds deposited by a user at transaction device 103. Receiver 115 may represent one or more of a financial institution, a merchant, another payment networks, a fund transfer network, or the like. In some embodiments, receiver 115 represents an entity that is not in the same country as payment network 113.

Figure 2A:
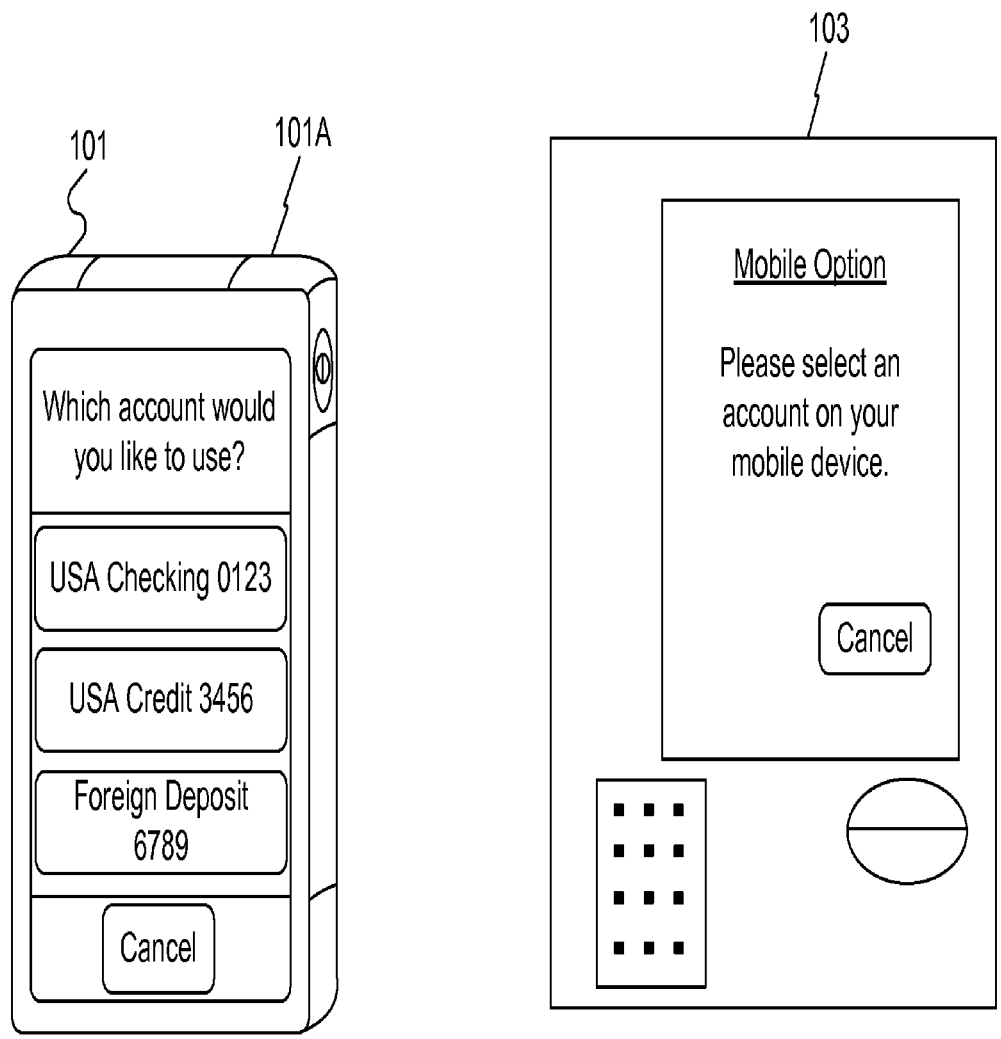
FIG. 2A shows illustrations of user interfaces for initializing a transaction using a mobile device and a transaction device, consistent with disclosed embodiments.
Figure 2B:
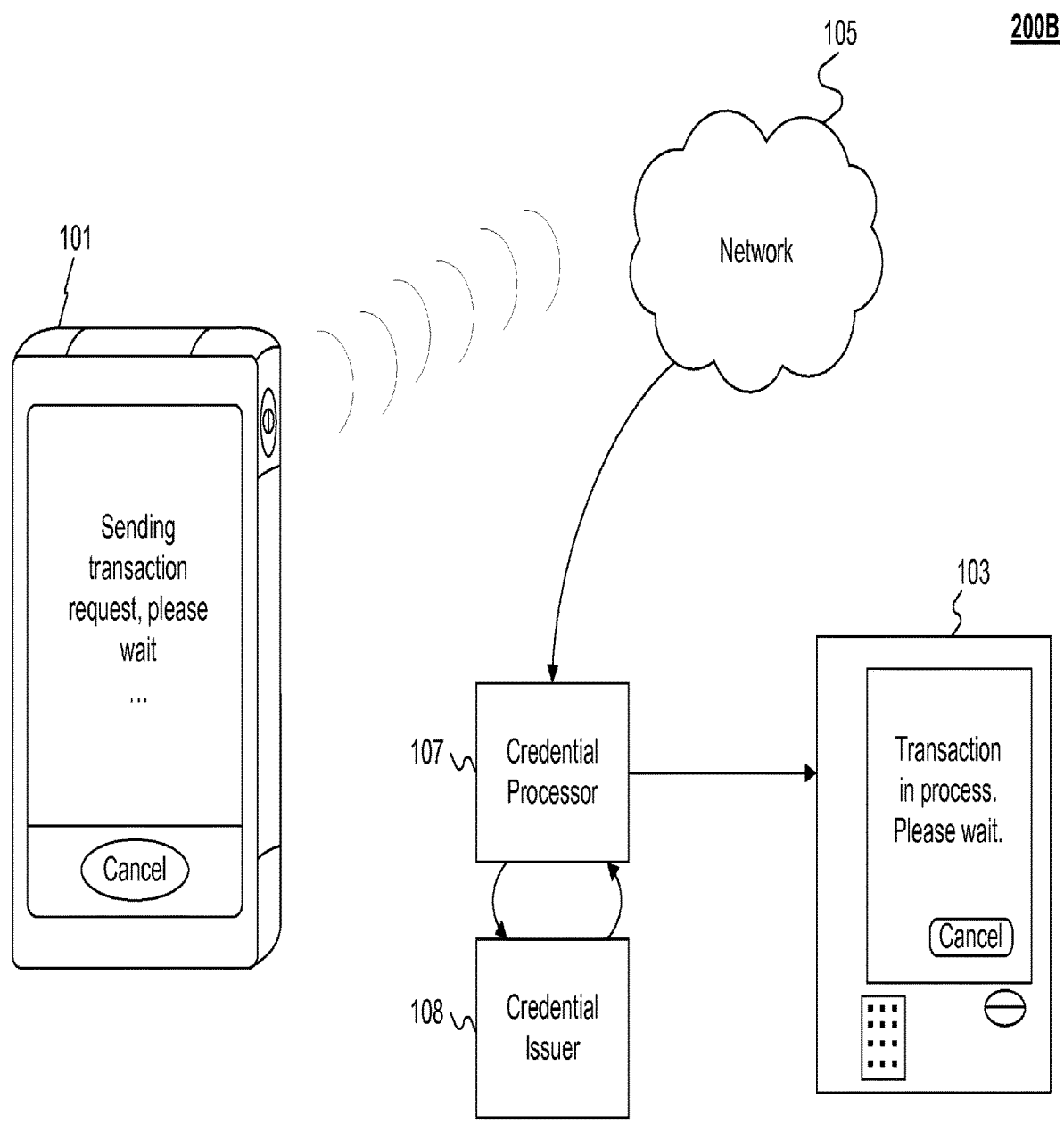
FIG. 2B shows illustrations of user interfaces and operations for processing a transaction using a mobile device and a transaction device, consistent with disclosed embodiments.

FIGS. 2A and 2B show illustrations of user interfaces for completing a transaction using mobile device 101 and transaction device 103. One of ordinary skill will understand that a variety of connections may be used to transmit data between transaction device 103 and mobile device 101, such as both devices communicating with a server connected to network 105, 802.11 wireless (Wi-Fi) connections, Bluetooth connections, Near-Field Communication (NFC), other types of wireless connections, or wired connections, may be used to transmit data between mobile device 101 and transaction device 103. One of ordinary skill will also understand that in some embodiments a visual symbol, such as a one- or two-dimensional barcode or other symbol, may be used to communicate data between transaction device 103 and mobile device 101 (e.g., by displaying such a symbol on a screen of transaction device 103 for capture by a camera attached to mobile device 101). Exemplary process flows using the interfaces depicted in FIGS. 2A and 2B are illustrated in FIG. 3B.

FIG. 2A shows exemplary illustrations of user interfaces 200A for performing a transaction using mobile device 101 and transaction device 103, consistent with disclosed embodiments.

In example FIG. 2A, a user has initiated a transaction request using mobile device 101. For example, the user may have pressed a button displayed on a touchscreen of mobile device 101, opened an application on mobile device 101, utilized a voice command system to initiate the transaction, or the like. In addition, the user may also have interacted with transaction device 103. For example, the user may have pressed buttons displayed on a touchscreen of transaction device 103 that represent a particular transaction and a desire to complete the transaction using mobile device 103.

Mobile device 101 and transaction device 103 may communicate with one another using a server (e.g., an electronic device) connected to network 105. As one example, mobile device 101 and transaction device 103 may both communicate with a device such as credential processor 107, in order to communicate information concerning the requested transaction from mobile device 101 to transaction device 103 and vice versa. In one example embodiment, the user may utilize mobile device 101 to identify the particular transaction device (here, transaction device 103) at which the user desires to accomplish the transaction. The user can identify transaction device 103 using, for example, location-based software, an identifier associated with transaction device 103 printed on the side of transaction device 103 or displayed on a screen of transaction device 103, a randomly-generated code displayed on a screen of transaction device 103, or the like. This enables the server (e.g., credential processor 107) to identify each of mobile device 101 and transaction device 103.

The requested transaction may comprise at least one of a cash withdrawal, a cash deposit, or a balance inquiry. Other transactions, such as purchases, payments, check-cashing, fund transfers (including loading or reloading a prepaid account), are possible as well.

Mobile device 101 may prompt the user to select an account. One of ordinary skill will understand that the one or more accounts displayed to the user on mobile device 101 may be based on the particular transaction requested by the user. For example, if the user initiates a withdrawal transaction, mobile device 101 may be configured to not display accounts that cannot have a withdrawal made against them (such as Certificates of Deposit). Alternatively, a prompt and account selection could be made available on the display of the transaction device in other embodiments not shown in the figures.

Transaction device 103 displays a message requesting the user to select an account on mobile device 101. As indicated above, prompts to the user may be made interchangeably upon the mobile device and the transaction device in various embodiments within the scope of the invention.

After selecting the account, mobile device 101 sends an identification of the selected account to credential processor 107.

FIG. 2B shows illustrations of user interfaces 200B for processing a transaction using a mobile device 101 and a transaction device 103, consistent with disclosed embodiments. Credential processor 107 receives an indication of the selected account and an identifier associated with transaction device 103.

In some embodiments, credential processor 107 determines a substitute value associated with the account selected by the user. Credential processor 107 sends the substitute value to transaction device 103. After receiving the substitute value from credential processor 107, transaction device 103 displays a message indicating that the transaction will be processed. For example, this could include transaction device 103 displaying a message to the user indicating that the transaction is being processed.

In other embodiments, credential processor 107 may be configured to send a dynamic token in lieu of or in addition to the substitute value to transaction device 103. In these embodiments, credential processor 107 sends a request for a dynamic token to credential issuer 108. The request includes, for example, the determined substitute value associated with the selected account, an identifier associated with transaction device 103, or the like. Credential issuer 108 generates a dynamic token that corresponds to the substitute value and stores it in a database for later look-up. The token may be in the form of a number, a string of letters, an alphanumeric string, or any identifier that enables credential issuer to determine an associated substitute value. In some embodiments, the dynamic token may conform to the format of a PAN, also known as a Primary Account Number. Credential issuer 108 then sends the token to credential processor 107 which may forward it to transaction device 103. After receiving the token from credential processor 107, transaction device 103 displays a message indicating that the transaction will be processed. For example, this could include transaction device 103 displaying a message to the user indicating that the transaction is being processed.

Figure 2D:
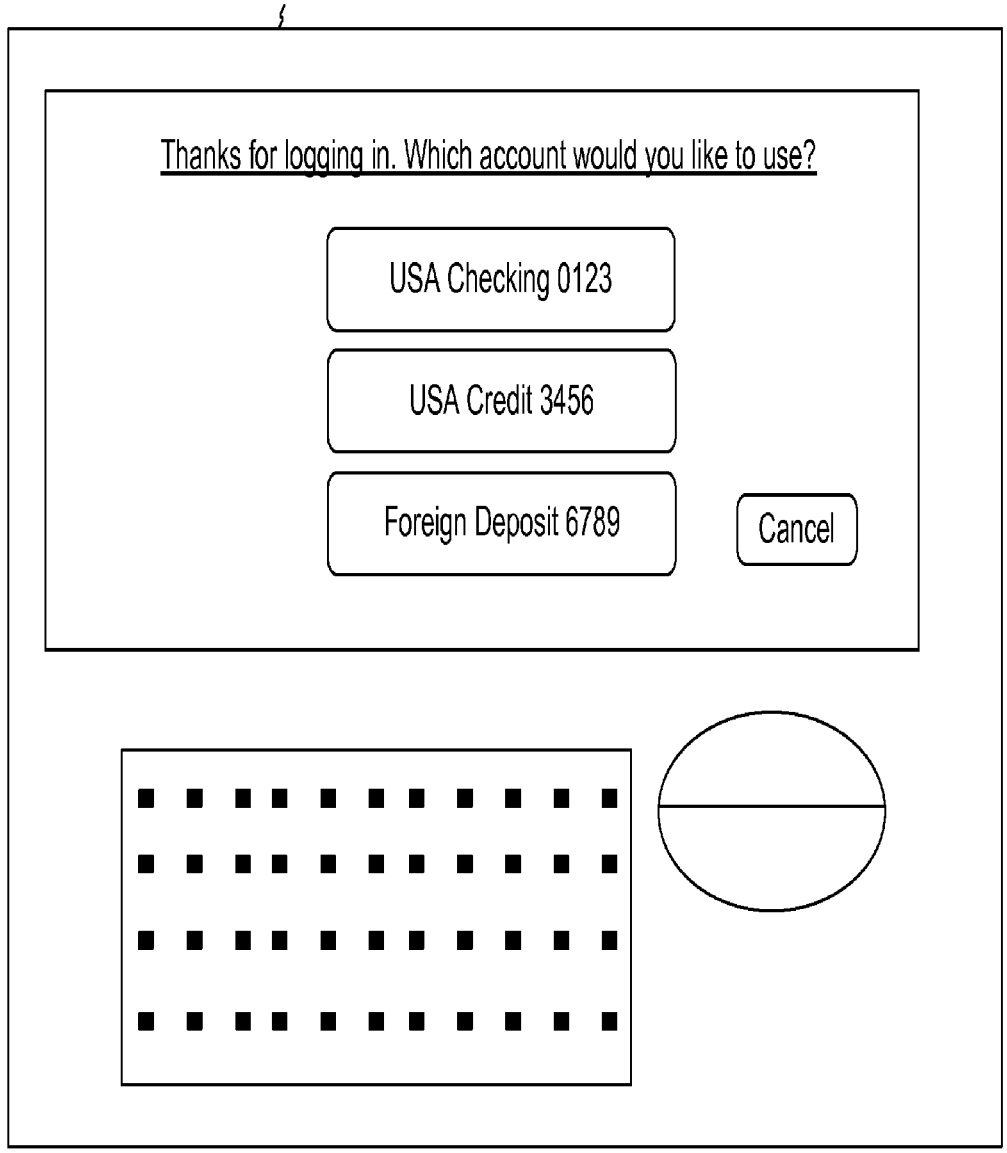
FIG. 2D shows illustrations of a user interface for processing a transaction using a transaction device, consistent with disclosed embodiments.

FIGS. 2C and 2D are illustrations of user interfaces for completing a transaction using transaction device 103. Exemplary process flows using the interfaces depicted in FIGS. 2C and 2D are illustrated in FIG. 3C.

FIG. 2C shows an illustration of a user interface 200C for processing a request to process a transaction using a transaction device 103. In FIG. 2C, a user interacts with transaction device 103 to provide user credentials. For example, the user may utilize keypad 103B to provide a username and password to transaction device 103. Any other type of credential may be provided including, for example, an identifier associated with mobile device, an e-mail address, biometric information, or the like, Transaction device 103 may then send the user credentials and a request for available accounts to credential processor 107, via network 105.

FIG. 2D shows an illustration of a user interface 200D for processing a transaction using a transaction device 103, consistent with disclosed embodiments. In FIG. 2D, the user has provided user credentials to transaction device 103, and transaction device 103 has sent the user credentials to credential processor. In response, transaction device 103 received the accounts associated with the received user credentials and presents them on a screen for selection by the user. The user is able to select an account for accomplishing the transaction, for example, by touching the screen. After the user selects an account, transaction device 103 sends an indication of that account to credential processor 107.

Figure 3A:
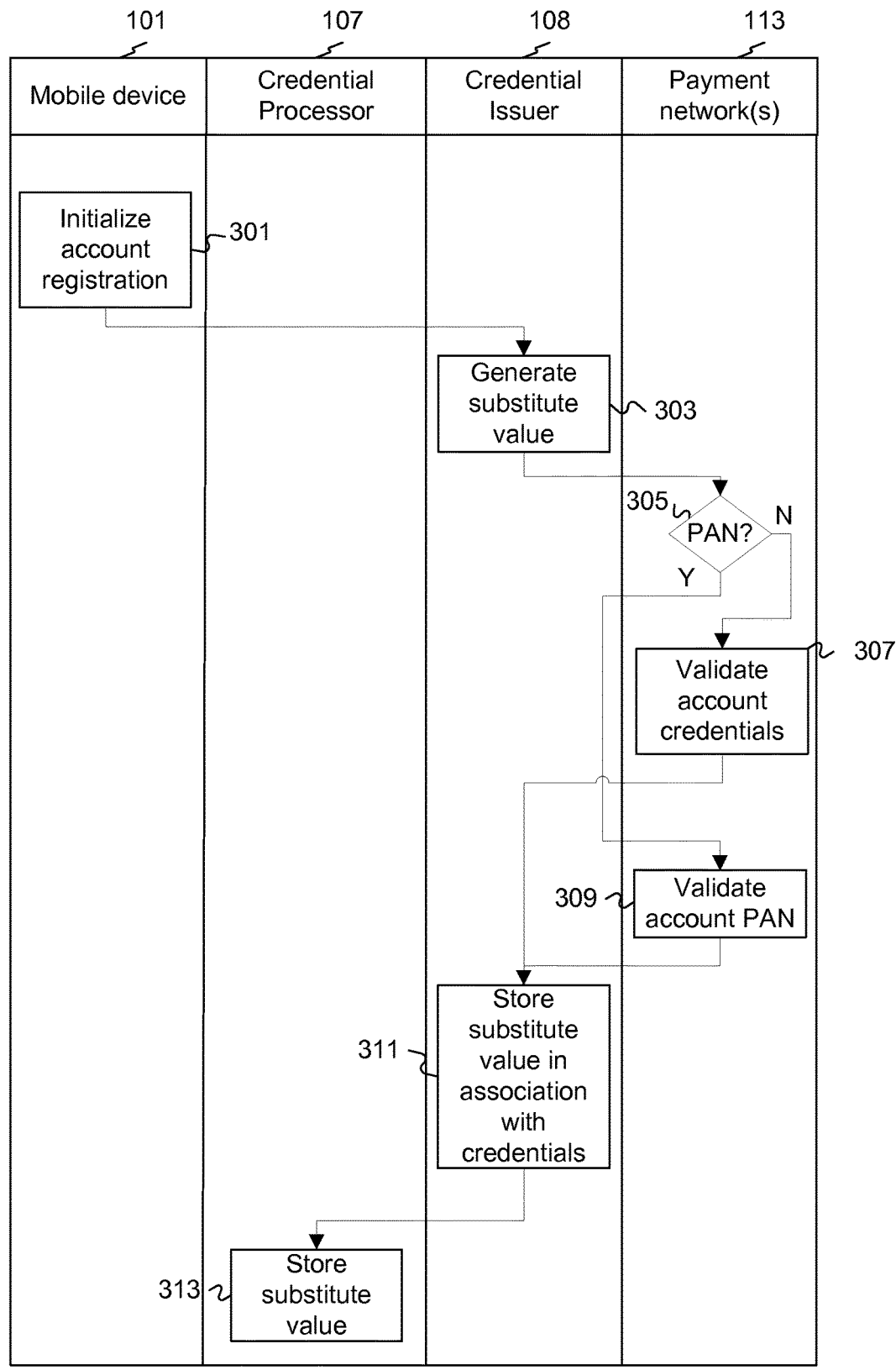
FIG. 3A is an example process for initializing account registration using a mobile device, consistent with disclosed embodiments.
Figure 3B:
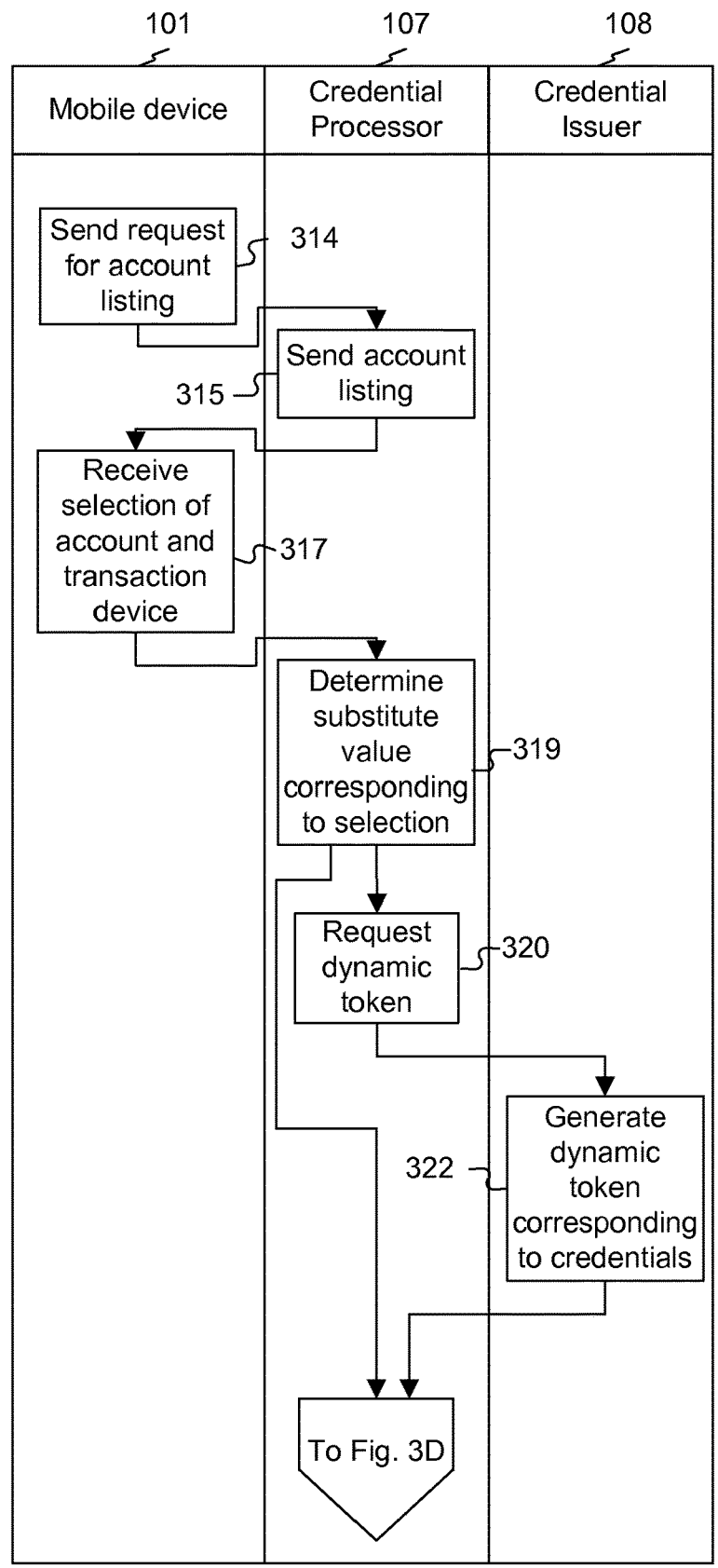
FIG. 3B is an example process for initializing a transaction using a mobile device, consistent with the disclosed embodiments.
Figure 3C:
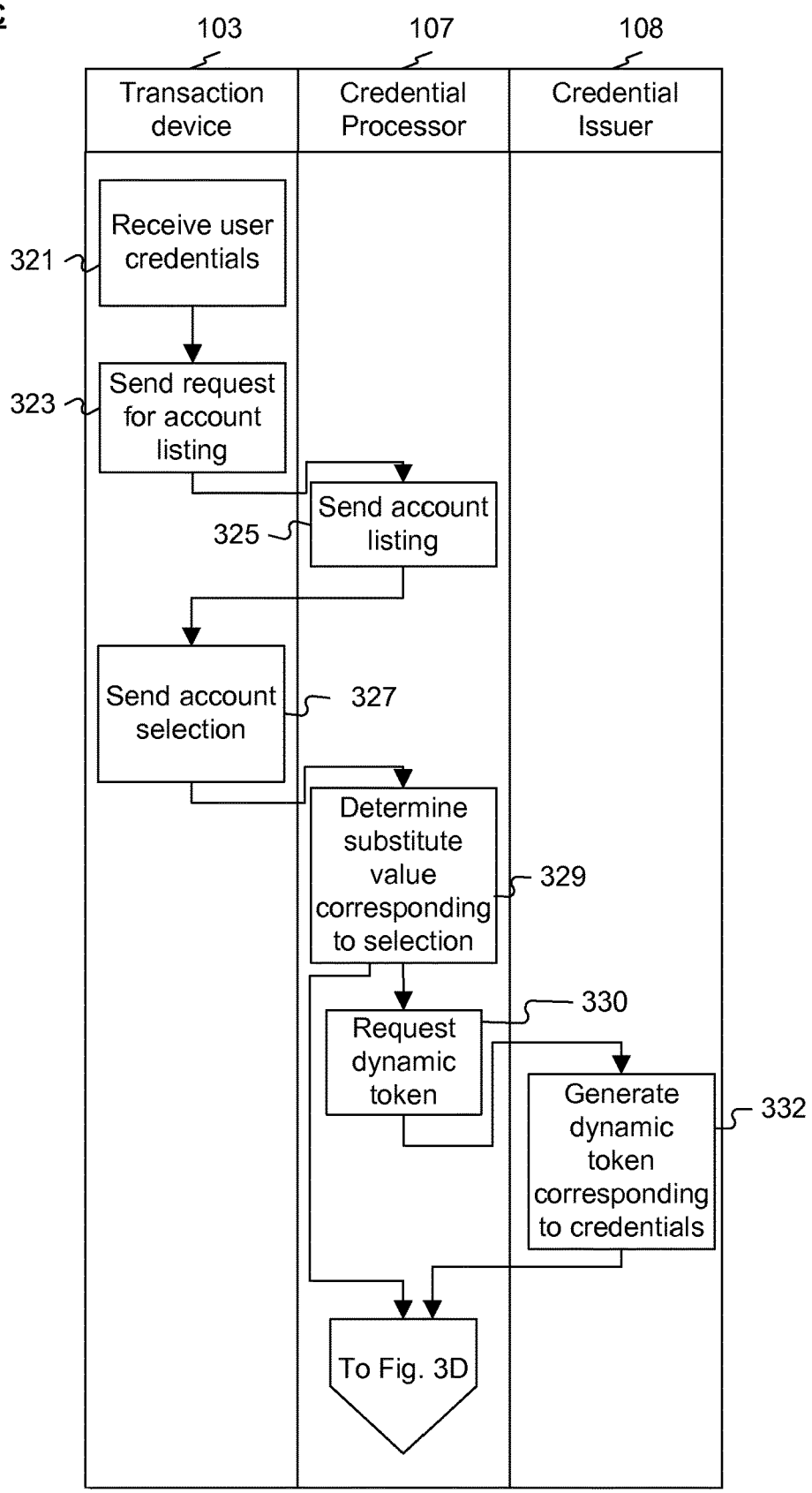
FIG. 3C is an example process for initializing a transaction using a transaction device, consistent with the disclosed embodiments.

FIG. 3A is an example process 300A for initializing account registration using a mobile device, consistent with disclosed embodiments.

In step 301, mobile device 101 sends user credentials and account credentials to credential issuer 108 to register each set of credentials. (In some embodiments, mobile device 101 may send user credentials and account credentials to an intermediate device such as credential processor 107 for forwarding to credential issuer 108.) Account credentials include, for example, a bank account number (including, for example, a Routing Transit Number and account number), a payment card number (including, for example, a bank card number printed on a debit card), or other account details. User credentials include, for example, an identifier associated with mobile device 101, a username and password, an e-mail address, biometric information, or the like. In the embodiment illustrated in FIG. 3A, step 301 is performed by a user using mobile device 101. In other embodiments, the user may send account credentials and user credentials to credential issuer 108 using other devices, such a personal computer, a transaction system, or the like. Still in other embodiments, the user may send account credentials and user credentials to credential issuer 108 using postal or electronic mail, may record the account credentials and/or user credentials during a telephone call with an automated system, or through any other means.

In step 303, credential issuer 108 receives account credentials and user credentials from mobile device 101. (In some embodiments, credential issuer 108 may receive the account credentials and user credentials from an intermediate device such as credential processor 107.) Credential issuer 108 generates a substitute value corresponding to the received account credentials. The substitute value may take any form, for example, alphanumeric, alphabetic, numeric, text, hash-based, or binary. In some embodiments, the substitute value may be formed such that transaction device 103 recognizes it as associated with a particular network (such as payment network 113).

As one example, the substitute value may be in the form of a constructed value. A constructed value, in some embodiments, comprises a string of numbers formatted to resemble a payment card number. For example, such a constructed value may contain a particular value as part of the BIN (Bank Identification Number), such as '59,' which indicates that the constructed value is associated with a particular network (such as payment network 113). Although the constructed value does not correspond to a particular account, the constructed value's attribute of resembling a payment card number facilitates routing a transaction that includes the constructed value via payment network 113, as though it were a traditional card-based transaction.

Credential issuer 108 sends the received account credentials and generated substitute value to payment network 113. In step 305, payment network 113 receives the account credentials and/or substitute value, and determines whether the account credentials or substitute value comprise a payment card number, also known as a PAN (Primary Account Number). If so, then, in step 309, payment network 113 validates the PAN. To validate the PAN, payment network 113 may communicate with a financial institution associated with the PAN (e.g., a bank that stores the account associated with the PAN), may make small monetary deposits into the account associated with the PAN and request the user to confirm the deposits, or the like. If the PAN is validated, payment network sends a confirmation to credential issuer 108. In step 311, credential issuer 108 stores the substitute value in association with the PAN received in step 303. Credential issuer 108 may store the substitute value in a look-up or cross-reference ("XREF") database in association with the account credentials received in step 303. In some embodiments, credential issuer 108 sends the substitute value to credential processor 107 and in step 313, credential processor 107 stores the substitute value.

However, if in step 305, payment network 113 determines that the account credentials comprise something other than a PAN, such as a Routing Transit Number and account number, payment network 113 validates the received account credentials in step 307. To validate the account credentials, payment network 113 may communicate with a financial institution associated with the credentials (e.g., a bank that stores the account associated with the credentials), may make small monetary deposits into the account associated with the credentials and request the user to confirm the deposits, or the like. If the account credentials are validated, payment network 113 sends a confirmation to credential issuer 108.

FIG. 3B is an example process 300B for initializing a transaction using mobile device 101, consistent with some embodiments.

In step 314, mobile device 101 sends a request to credential processor 107, requesting a list of accounts associated with a particular user. For example, credential processor 107 may have a database containing user credentials (e.g., a username/password combination) associated with a user and/or one or more accounts associated with the user. In step 315, credential processor 107 determines accounts associated with received user credentials and sends a list of these accounts to mobile device 101. For example, credential processor 107 determines a list of such accounts by consulting a database which associates user credentials and account credentials or substitute values. Credential processor 107, in some embodiments, sends a list of the accounts associated with the received user credentials without sending any account credentials like account numbers or card numbers. The list sent by credential processor 107 may comprise titles (such as "Bank A Deposit Account #1") or portions of account information (such as "Bank B Savings Account XXXXX3667").

Mobile device 101 receives the account list and presents the list to the user. In step 317, mobile device 101 receives a selection of an account with which to accomplish a desired transaction, and sends that selection to credential processor 107. In some embodiments, in step 319, credential processor 107 determines a substitute value associated with the selected account based on the received user credentials and account selection. The process then continues to FIG. 3D for processing the transaction.

In other embodiments, credential processor 107 may be configured to send a dynamic token in lieu of or in addition to the substitute value to transaction device 103 or mobile device 101. In these embodiments, in step 320, credential processor 107 generates and sends a request for a dynamic token to credential issuer 108. The request includes, for example, the determined substitute value associated with the selected account, an identifier associated with transaction device 103 or mobile device 101, or the like. In step 322, credential issuer 108 generates a dynamic token that corresponds to the substitute value and stores it in a database for later look-up. The token may be in the form of a number, a string of letters, an alphanumeric string, or any identifier that enables credential issuer to determine an associated substitute value. In some embodiments, the dynamic token may conform to the format of a PAN, also known as a Primary Account Number. Credential issuer 108 then sends the token to credential processor 107.

FIG. 3C is another example process for initializing a transaction, using transaction device 103, consistent with the disclosed embodiments. One of ordinary skill will understand that FIG. 3C is an alternative process to that depicted in FIG. 3B. In step 321, transaction device 103 receives user credentials. For example, a user may use a keypad to enter user credentials at transaction device 103. As described above, any type of credential may be provided by the user including, for example, an identifier associated with mobile device, an e-mail address, phone number, biometric information (e.g., fingerprint scan, facial recognition, or retina scan) or the like. Transaction device can also receive user credentials from mobile device 101 (e.g., over a wired/wireless connection with mobile device 101).

In step 323, transaction device 103 sends the user credentials with a request for a listing of account associated with a particular user. For example, credential processor 107 may have one or more accounts associated with user credentials (e.g., a username/password combination). In step 325, credential processor 107 determines accounts associated with received user credentials and sends a list of these accounts to transaction device 103. For example, credential processor 107 determines a list of such accounts by consulting a database which associates user credentials and account credentials. Credential processor 107 then, in some embodiments, sends a list of the accounts associated with the received user credentials to transaction device 103 without sending any account credentials like account numbers or card numbers. The list sent by credential processor 107 may comprise titles (such as "Bank A Deposit Account #1") or portions of account information (such as "Bank B Savings Account XXXXX3667").

Transaction device 103 receives the account list and presents the list to the user. In step 327, the user selects one of the presented accounts using, for example, a touchscreen or a keypad on transaction device 103. Transaction device 103 then sends an indication of the selected account to credential processor 107. In some embodiments, in step 329, credential processor 107 determines a substitute value associated with the selected account based on the received user credentials and account selection. The process then continues to FIG. 3D for processing the transaction.

In other embodiments, credential processor 107 may be configured to send a dynamic token in lieu of or in addition to the substitute value to transaction device 103. In these embodiments, in step 330, credential processor 107 generates and sends a request for a dynamic token to credential issuer 108. The request includes, for example, the determined substitute value associated with the selected account, an identifier associated with transaction device 103, or the like. In step 332, credential issuer 108 generates a dynamic token that corresponds to the substitute value and stores it in a database for later look-up. The token may be in the form of a number, a string of letters, an alphanumeric string, or any identifier that enables credential issuer to determine an associated substitute value. Credential issuer 108 then sends the token to credential processor 107.

Figure 3D:
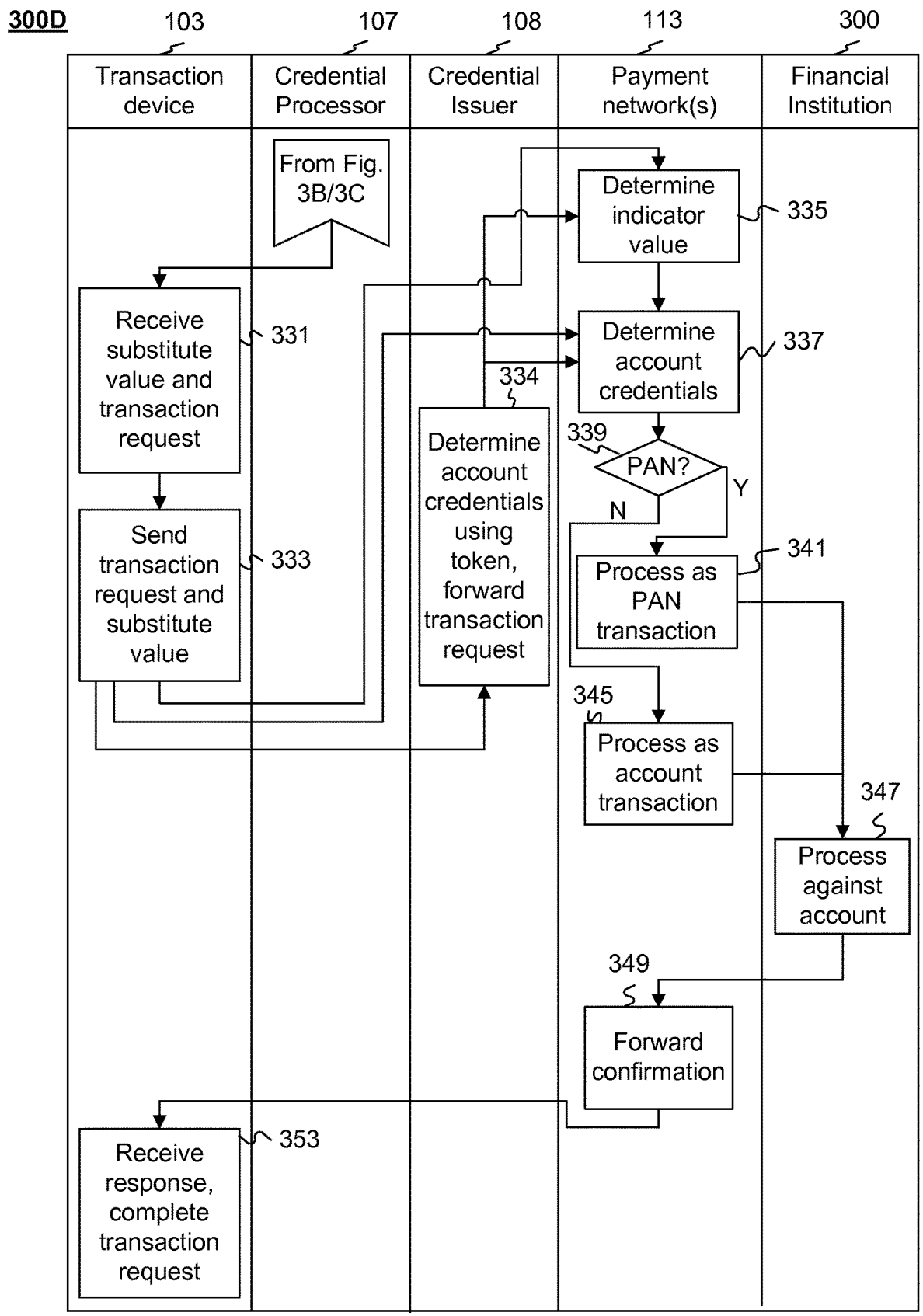
FIG. 3D is an example process for processing a transaction using a transaction device, consistent with disclosed embodiments.

FIG. 3D is an example process 300D for processing a transaction using a transaction device 103 and a credential processor 107, consistent with disclosed embodiments.

In step 331, transaction device 103 receives the substitute value (which could be a constructed value or a dynamic token, as appropriate). Transaction device 103 also receives a transaction request. For example, a user may utilize a keypad or touchscreen on transaction device 103 to input the transaction type desired by a user, such as a withdrawal, deposit, balance inquiry, bill payment, fund transfer, or the like. The transaction type received by transaction device 103 may be a transaction parameter. In some embodiments, a transaction request may include more than one transaction parameter. For example, if a user wants to withdraw $20.00 and purchase a book of stamps, the transaction request can include two transaction parameters—a first indicating a withdrawal of $20.00 and a second indicating a purchase of a book of stamps.

In embodiments where the substitute value is a constructed value, transaction device 103 also may determine a payment network associated with the constructed value, such as payment network 113. In some embodiments, this may involve routing the transaction to another payment network within payment network 113 that is associated with the constructed value. As discussed previously, constructed values may contain an indicator value, such as a Bank Identification Number (BIN). Transaction device 103 may use the indicator value to determine the correct payment network. In this case, transaction device 103 may determine that the indicator value comprises the value '59' and that an indicator value of '59' corresponds to payment network 113. In such embodiments, in step 333, transaction device 103 may send the transaction request and the constructed value to payment network 113 and proceed to step 335, as discussed below.

In other embodiments, for example, where the substitute value is not a constructed value (being, for example, a username, phone number, or other identifier), transaction device 103 may recognize the substitute value as being associated with payment network 113. In such embodiments, in step 333, transaction device 103 may send the transaction request and the substitute value to payment network 113 and proceed to step 337, as discussed below.

Still in other embodiments, transaction device 103 may recognize that the substitute value is a dynamic token. Such tokens are associated with credential issuer 108. In such embodiments, in step 333, transaction device 103 may send the transaction and dynamic token to credential issuer 108 and proceed to step 334. Credential issuer 108 may store an association between a token and account credentials. When, at step 334, credential issuer 108 receives a dynamic token associated with a transaction request, credential issuer 108 can perform a lookup in a table to determine account credentials for processing the transaction (such as a substitute value). Based on the determined substitute value, credential issuer may forward the transaction request and substitute value to payment network 113.

Communications by transaction device at step 333 may, in some embodiments, comprise at least one of the received substitute value, information concerning the requested transaction, an identification associated with transaction device 103, the current time or date, or other information.

Continuing the description of the illustrative transaction flow, in step 335, payment network 113 may recognize the indicator value included in the received constructed value, and from the indicator value, determine a corresponding payment network. As described above, the corresponding payment network may be the same or a different payment network within payment network 113 and may be operated or controlled by the same or separate entities.

In step 337, payment network 113 may receive the transaction request and substitute value from credential issuer 108, or from the determination of an indicator value in step 335. Payment network 113 then performs a cross-reference in a database to determine account credentials corresponding to the received substitute value. As explained above with respect to FIG. 3A, the account credentials may include, for example, a bank account number (including, for example, a Routing Transit Number and account number), a payment card number (including, for example, a card number printed on a debit card), or other account details.

Once payment network 113 determines the account credentials corresponding to the received substitute value, the process continues to step 339. In step 339, payment network 113 determines whether the account credentials comprise a payment card number (also known as a PAN or Primary Account Number). If not, the process continues to step 345, where payment network 113 processes the transaction using the account credentials. Processing the transaction in step 345 comprises, for example, payment network 113 determining which financial institution contains the account corresponding to a determined Routing Transit Number, recording the effect of the transaction (e.g., a debit or a credit), and initiating communication with the determined financial institution 300.

Payment network 113 sends the transaction request to the financial institution associated with a determined Routing Transit Number, financial institution 300. Financial institution 300 contains the account associated with the received account credentials, and may be one of domestic bank 111 or receiver 115. In step 347, financial institution 300 receives the transaction and effects the transaction against the account requested by the user. For example, if the transaction indicates that the user wants to withdraw money from the account, financial institution 300 debits the account by the amount that the user wishes to withdraw. In some embodiments, financial institution 300 may add a fee to the amount debited from the user's account, to account for service fee(s) imposed by one of financial institution 300, payment network 113, or transaction device 103. As another example, if the transaction request indicates a desire to deposit funds, financial institution 300 credits the determined account.

After processing the transaction in step 347, financial institution 300 returns a confirmation message to payment network 113 indicating whether the transaction request succeeded or failed.

However, if in step 339, payment network 113 determines that the account credentials associated with the substitute value comprise a PAN, payment network 113 may process the transaction as a PAN transaction. Processing the transaction as a PAN transaction comprises, for example processing the transaction using processes utilized for card-based transactions. In some embodiments, this may involve routing the transaction to another payment network within payment network 113 that is associated with the PAN. Processing the transaction in step 341 comprises, for example, payment network 113 determining which financial institution contains the account corresponding to a received PAN, recording the effect of the transaction (e.g., a debit or a credit), and initiating communication with the determined financial institution 300.

Payment network 113 sends the transaction request to the financial institution associated with the PAN, financial institution 300. Financial institution 300 contains the account associated with the received account credentials, and may be one of domestic bank 111 or receiver 115. In step 347, financial institution 300 receives the transaction and effects the transaction against the account requested by the user. For example, if the transaction indicates that the user wants to withdraw money from the account, financial institution 300 debits the account by the amount that the user wishes to withdraw. In some embodiments, financial institution 300 may add a fee to the amount debited from the user's account, to account for service fee(s) imposed by one of financial institution 300, payment network 113, or transaction device 103. As another example, if the transaction request indicates a desire to deposit funds, financial institution 300 credits the determined account. Financial institution 300 then returns a confirmation message to payment network 113 indicating whether the transaction request succeeded or failed.

In some embodiments, financial institution 300 effects the transaction against the account based on the type of transaction (e.g., PAN transaction or account transaction). For example, if financial institution 300 receives a PAN for processing the transaction, financial institution 300 may consult a database to determine an account number that corresponds to the PAN, in order to determine which account the transaction should be effected against.

In step 349, payment network 113 receives a confirmation message from financial institution 300. Payment network 113 may record the confirmation message (e.g., for auditing purposes) and forward the confirmation message to transaction device 103. Transaction device 103 receives the confirmation message and completes the transaction request appropriately. For example, if the confirmation message from financial institution 300 indicates that a withdrawal transaction request was successful, transaction device 103 may complete the transaction request by dispensing funds to the user through cash drawer 103D. If the confirmation message from financial institution 300 indicates that a deposit transaction request was successful, transaction device 103 may complete the transaction request by receiving funds from the user through cash drawer 103D.

Figure 4:
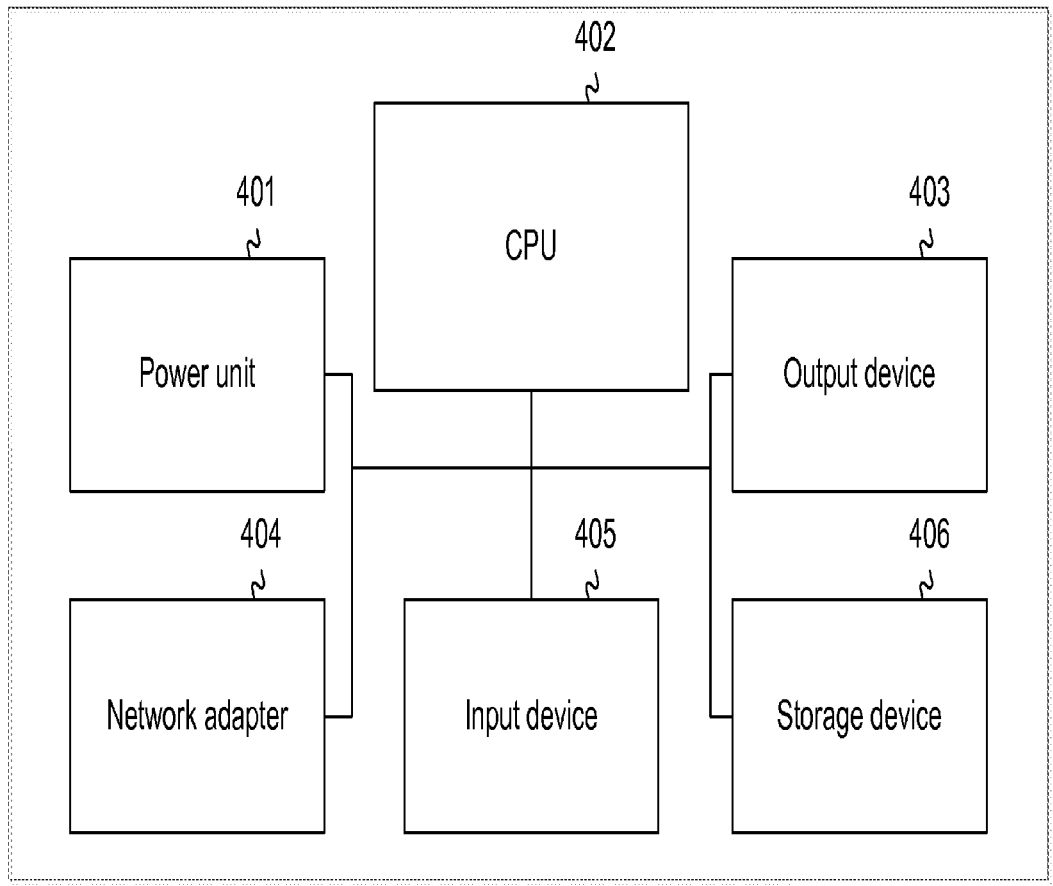
FIG. 4 is an example of a computer system for use in implementing the disclosed systems, consistent with disclosed embodiments.

FIG. 4 illustrates example computer system 400 for implementing the disclosed embodiments. Each component depicted in these figures (e.g., mobile device 101, transaction device 103, credential processor 107, credential issuer 108, domestic bank 111, payment network 113, and receiver 115) may be implemented as illustrated in computer system 400. In some embodiments, the components in FIG. 4 may be duplicated, substituted, or omitted. In some embodiments, system 400 can be implemented, as appropriate, as a cellular phone, a mobile device, a POS (point-of-sale) device, a transaction device, an ATM, a cash-dispensing, pre-paid card loading or reload, check cashing or deposit, or other value-dispensing device, a server, a wireless device, or any other system that includes at least some of the components of FIG. 4. Each of the components in FIG. 4 can be connected to one another using, for example, a wired interconnection system such as a bus.

System 400 comprises power unit 401. Power unit 401 can be implemented as a battery, a power supply, or the like. Power unit 401 provides the electricity necessary to power the other components in system 400. For example, CPU 402 needs power to operate. Power unit 401 can provide the necessary electric current to power this component.

System 400 contains a Central Processing Unit (CPU) 402, which enables data to flow between the other components and manages the operation of the other components in computer system 400. CPU 402, in some embodiments, can be implemented as a general-purpose processor (such as an Intel- or AMD-branded processor), a special-purpose processor (for example, a graphics-card processor or a mobile processor), or any other kind of processor that enables input and output of data.

System 400 also comprises output device 403. Output device 403 can be implemented as a monitor, printer, speaker, plotter, or any other device that presents data processed, received, or sent by computer system 400.

System 400 also comprises network adapter 404. Network adapter 404, in some embodiments, enables communication with other devices that are implemented in the same or similar way as computer system 400. Network adapter 404, in some embodiments, may allow communication to and/or from a network such as the Internet. Network adapter 404 may be implemented using any or all of known or as-yet-unknown wired or wireless technologies (such as Ethernet, 802.11a/b/g/n (aka Wi-Fi), cellular (e.g. GSM, CDMA, LTE), or the like).

System 400 also comprises input device 405. In some embodiments, input device 405 may be any device that enables a user or other entity to input data. For example, input device 405 could be a keyboard, a mouse, or the like. Input device 405 can be used to control the operation of the other components illustrated in FIG. 4.

System 400 also includes storage device 406. Storage device 406 stores data that is usable by the other components in system 400. Storage device 406 may, in some embodiments, be implemented as a hard drive, temporary memory, permanent memory, optical memory, or any other type of permanent or temporary storage device. Storage device 406 may store one or more modules of computer program instructions and/or code that creates an execution environment for the computer program in question, such as, for example, processor firmware, a protocol stack, a database management system, an operating system, or a combination thereof.

The term "processor system," as used herein, refers to one or more processors (such as CPU 402). The disclosed systems may be implemented in part or in full on various computers, electronic devices, computer-readable media (such as CDs, DVDs, flash drives, hard drives, or other storage), or other electronic devices or storage devices. The methods and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). While disclosed processes include particular process flows, alternative flows or orders are also possible in alternative embodiments.

Certain features which, for clarity, are described in this specification in the context of separate embodiments may also be provided in combination in a single embodiment. Conversely, various features which, for brevity, are described in the context of a single embodiment may also be provided in multiple embodiments separately or in any suitable sub-combination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments have been described. Other embodiments are within the scope of the following claims.

What is claimed is:

1. A system for processing a cardless transaction at an Automated Teller Machine (ATM), comprising:
one or more memory devices storing instructions; and
one or more processors configured to execute the instructions to:
identify, at a server comprising the one or more processors, each of a mobile device and an ATM via a scanning by a user of the mobile device of a randomly-generated identifier displayed on the ATM, and based on the identification, establish a communicative connection between the mobile device, the ATM, and the server;
receive, at the server, a list request for accounts associated with the user from the mobile device, the list request including user credentials;
determine, at the server, one or more accounts associated with the user credentials;
transmit, from the server, account information for each of the one or more accounts associated with the user credentials to the mobile device;
receive, at the server, a selected account from the mobile device, the selected account being selected by the user from the one or more accounts associated with the user credentials transmitted to the mobile device;
determine, at the server, a substitute value corresponding to the selected account, the substitute value being a first alphanumeric string generated during a registration of the selected account, the substitute value representing an account number of the selected account, the substitute value being distinct from the account number of the selected account;
generate, at the server, a dynamic token associated with the user credentials, the dynamic token comprising a second alphanumeric string representing the user credentials;
transmit a transaction request to the ATM from the server, the transaction request including one or more transaction parameters, the substitute value, and the dynamic token such that the account number of the selected account and the user credentials are not communicated to the ATM;
determine, at the ATM, the account information of the selected account using the substitute value received in the transaction request;
verify, at the ATM, the user credentials using the dynamic token received in the transaction request; and
transmit from the ATM the account information of the selected account and the one or more transaction parameters to a payment network.

2. The system of claim 1, wherein the substitute value is a constructed value comprising a string of numbers formatted to resemble a payment card number.

3. The system of claim 2, wherein the constructed value contains a Bank Identification Number.

4. The system of claim 1, wherein the dynamic token is distinct from the account information of the selected account and is usable for only one transaction.

5. The system of claim 1, wherein the dynamic token comprises a string of numbers formatted to resemble a payment card number.

6. The system of claim 1, wherein the one or more transaction parameters comprises at least one of a withdrawal, deposit, balance inquiry, ticket purchase, stamp purchase, or balance transfer.

7. The system of claim 1, wherein the one or more processors are further configured to execute the instructions to:
receive an account registration request from the mobile device, the account registration request including the user credentials and one or more accounts for association with the user credentials;
generate a substitute value for each of the one or more new accounts; and
store each generated substitute value in association with the user credentials in a cross-reference database.

8. The system of claim 7, wherein the one or more processors are further configured to execute the instructions to:
determine whether the generated substitute value is a payment card number, wherein:
if the substitute value is a payment card number, the substitute value is validated by a payment network in communication with a financial institution associated with the payment card number; and
if the substitute value is not a payment card number, the substitute value is validated by a payment network based on a monetary deposit into the account associated with the substitute value and confirmation by the user of the amount of the monetary deposit.

9. The system of claim 1, wherein the one or more processors are further configured to execute the instructions to:
process a transaction according to the one or more transaction parameters by forwarding the one or more transaction parameters to a financial institution;
receive a confirmation of processing of the transaction by the financial institution; and
end the transaction request in response to receiving the confirmation.

10. The system of claim 9, wherein the one or more processors are further configured to execute the instructions to dispense funds to the user through a cash drawer of the ATM upon receipt of the confirmation.

11. A computer-implemented method for processing a cardless transaction, comprising:
identifying, at a credential processor, each of a mobile device and an Automated Teller Machine (ATM) via a scanning by a user of the mobile device of a randomly-generated identifier displayed on the ATM, and based on the identification, establishing a communicative connection between the mobile device, the ATM, and the credential processor;
receiving, at the credential processor, a list request for accounts associated with the user from the mobile device, the list request including user credentials;
determining, via the credential processor, one or more accounts associated with the user credentials;
transmitting, via the credential processor, account information for each of the one or more accounts associated with the user credentials to the mobile device;
receiving, at the credential processor, a selected account from the mobile device, the selected account being selected by the user from the one or more accounts associated with the user credentials transmitted to the mobile device;
determining, via the credential processor, a substitute value corresponding to the selected account, the substitute value being a first alphanumeric string generated during a registration of the selected account, the substitute value representing an account number of the selected account, the substitute value being distinct from the account number of the selected account;

generating, via the credential processor, a dynamic token associated with the user credentials, the dynamic token comprising a second alphanumeric string representing the user credentials;

transmitting, to the ATM, a transaction request from the credential processor, the transaction request including one or more transaction parameters, the substitute value, and the dynamic token such that the account number of the selected account and the user credentials are not communicated to the ATM;

determining, at the ATM, the account information of the selected account using the substitute value received in the transaction request;

verifying, at the ATM, the user credentials using the dynamic token received in the transaction request; and transmitting the account information of the selected account and the one or more transaction parameters from the ATM to a payment network.

12. The method of claim 11, wherein the substitute value is a constructed value comprising a string of numbers formatted to resemble a payment card number.

13. The method of claim 12, wherein the constructed value contains a Bank Identification Number.

14. The method of claim 11, wherein the dynamic token is distinct from the account information of the selected account and is usable for only one transaction.

15. The method of claim 11, wherein the dynamic token comprises a string of numbers formatted to resemble a payment card number.

16. The method of claim 11, wherein the one or more transaction parameters comprises at least one of a withdrawal, deposit, balance inquiry, ticket purchase, stamp purchase, or balance transfer.

17. The method of claim 11, further comprising:
receiving an account registration request from the mobile device, the account registration request including the user credentials and one or more accounts for association with the user credentials;
generating a substitute value for each of the one or more accounts; and
storing each generated substitute value in association with the user credentials in a cross-reference database.

18. The method of claim 17, further comprising:
determining whether the generated substitute value is a payment card number, wherein:
if the substitute value is a payment card number, the substitute value is validated by a payment network in communication with a financial institution associated with the payment card number; and
if the substitute value is not a payment card number, the substitute value is validated by a payment network based on a monetary deposit into the account associated with the substitute value and confirmation by the user of the amount of the monetary deposit.

19. The method of claim 11, further comprising:
processing a transaction according to the one or more transaction parameters by forwarding the one or more transaction parameters to a financial institution;
receiving a confirmation of processing of the transaction by the financial institution; and
ending the transaction request in response to receiving the confirmation.

20. The method of claim 19, further comprising dispensing funds to the user through a cash drawer of the ATM upon receipt of the confirmation.

* * * * *